Patented Dec. 5, 1933

1,938,014

UNITED STATES PATENT OFFICE 1,938,014

GREEN DYESTUFFS OF THE DIPHENYL-NAPHTHYLMETHANE SERIES

Bruno Francke, Frankfort-on-the-Main-Hochst, Germany, assignor to General Aniline Works, Inc., New York, N. Y., a corporation of Delaware No Drawing. Application January 30, 1931, Serial No. 512,505, and in Germany February 10, 1930

3 Claims. (Cl. 260—68)

The present invention relates to new green dyestuffs of the diphenylnaphthylmethane series.

I have found that green dyestuffs of the diphenylnaphthylmethane series are obtainable by oxidizing di-(paradialkylaminophenyl-) sulfonaphthylmethanes of the following general formula wherein $X_1$ stands for an alkyl group containing more than two carbon atoms, $X_2$ stands for an alkyl group.

The di-(para-dialkylaminophenyl-) sulfonaphthylmethanes may be obtained by different methods, for instance, by condensing naphthaldehydes with aromatic dialkylamines and sulfonating the products thus obtained or by condensing either tetra-alkyldiaminobenzhydroles with naphthalenesulfonic acids or naphthaldehyde-sulfonic acids with aromatic dialkylamines.

The new dyestuffs correspond with the following general formula wherein $X_1$ stands for an alkyl group containing more than two carbon atoms, $X_2$ stands for an alkyl group.

In comparison with the dyestuffs of the diphenylnaphthylmethane series hitherto known, they yield more yellow and more vivid tints of better fastness properties and possess greater tinctorial power.

The following examples serve to illustrate the invention, but they are not intended to limit it thereto, the parts being by weight:

(1) 16 parts of alpha-naphthaldehyde, 50 parts of n-butylisobutylaniline, 20 parts of sulfuric acid of 66° Bé. and 8 parts of water are heated to 95° C.–100° C. for about 150 hours while stirring. Water is added to the melt thus obtained which, subsequently, is rendered distinctly alkaline by addition of sodium carbonate and freed from unaltered n-butyl-isobutylaniline by steam distillation. The leuco-base thus obtained is washed and dried.

1 part of the dry leuco-base is dissolved by stirring it into 5 parts of sulfuric acid monohydrate at 20° C.–25° C. and sulfonated at 20° C.–25° C. by gradual addition of the necessary quantity of fuming sulfuric acid of 65% strength. By precipitating the sulfuric acid by means of calcium carbonate and causing the calcium salt to react with sodium carbonate, there is obtained a solution of the sodium salt of the leucodisulfonic acid which may be directly oxidized by one of the usual methods.

By salting out the oxidized solution by means of sodium chloride, a dyestuff is obtained which corresponds with the following formula:

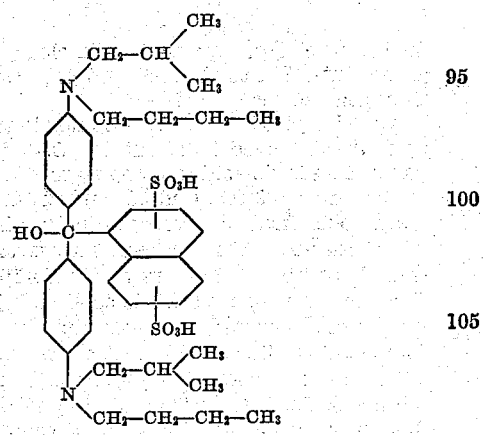

It dyes wool and, especially, loaded or unloaded silk vivid clear, very yellowish-green tints of good fastness properties. Moreover, the dyestuff has a great tinctorial power.

(2) 16 parts of alpha-naphthaldehyde, 50 parts of n-dibutylaniline, 20 parts of sulfuric acid of 66° Bé. and 8 parts of water are condensed and worked up as described in Example 1. There is obtained a dyestuff of the following formula:

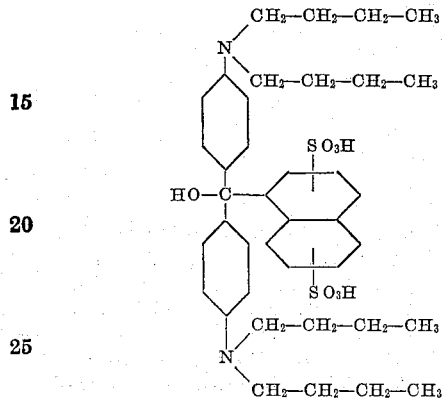

yielding very yellowish-green tints of fastness properties similar to those of the dyestuff obtained according to Example 1.

(3) 16 parts of alpha-naphthaldehyde, 42 parts of ethyl-n-butylaniline, 20 parts of sulfuric acid of 66° Bé. and 8 parts of water are condensed and worked up as described in Example 1. By salting out the oxidized solution, a dyestuff is obtained which corresponds with the following formula:

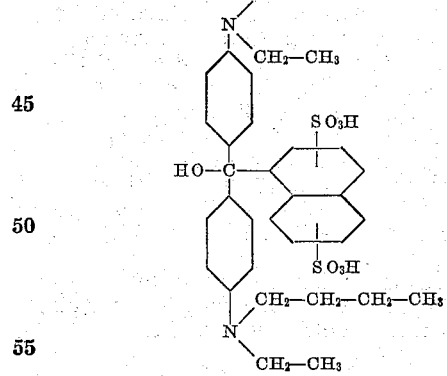

dyeing wool from an acid bath clear, yellowish-green tints, fast to alkalies, and possessing a good tinctorial power.

(4) 35 parts of 2.7-naphthalenedisulfonic acid are dissolved at about 50° C.-60° C. in 250 parts of sulfuric acid monohydrate. The solution is heated to 100° C., and 53 parts of tetra-butyl-diaminobenzhydrol are gradually introduced, while stirring. The temperature is then maintained for about 36 hours at 95° C.-100° C., and the solution is poured, while cooling, into 10 parts its weight of water. The precipitated leucosulfonic acid is filtered with suction, washed, diluted with sodium carbonate and oxidized in the usual manner. The dyestuff obtained by salting out the oxidized solution, dyes wool clear, yellowish-green tints of especially good fastness to washing and fulling and is distinguished by an excellent tinctorial power. It has the following formula

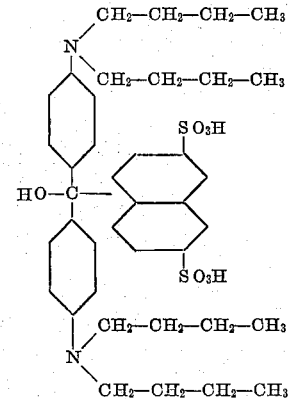

(5) 31.6 parts of naphthaldehyde-2.4-disulfonic acid are condensed in dilute sulfuric acid with 45 parts of dibutyl-aniline, and the leuco-compound, thus obtained, is oxidized in the usual manner. There is obtained a very yellowish-green dyestuff of the following formula:

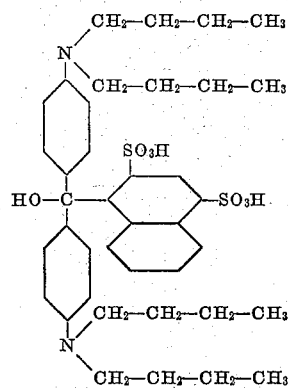

having properties similar to those of the dyestuffs obtained according to Examples 1 and 2.

I claim:

1. Dyestuffs of the diphenylnaphthylmethane series of the following general formula

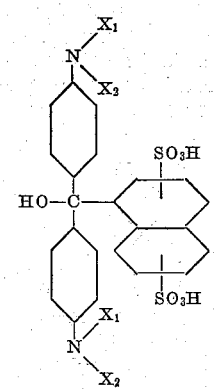

wherein $X_1$ stands for an alkyl group containing more than two carbon atoms, $X_2$ stands for an alkyl group, said dyestuffs dyeing wool vivid clear yellowish-green shades of good fastness properties and possessing good tinctorial power.

2. The dyestuff of the diphenylnaphthylmethane series of the following formula

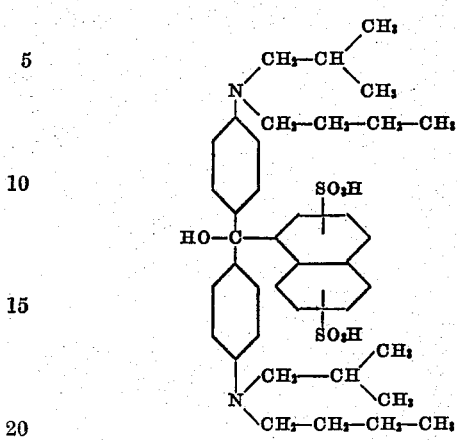

said dyestuff dyeing wool vivid clear yellowish-green shades of good fastness properties and possessing good tinctorial power.

3. The dyestuff of the diphenylnaphthylmethane series of the following formula

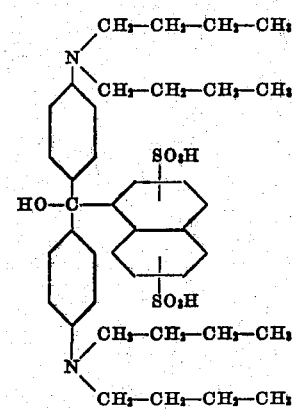

said dyestuff dyeing wool vivid clear yellowish-green shades of good fastness properties and possessing good tinctorial power.

BRUNO FRANCKE.